C. W. SAALBURG.
EXHIBITION DEVICE.
APPLICATION FILED OCT. 20, 1911.
1,053,650.
Patented Feb. 18, 1913.
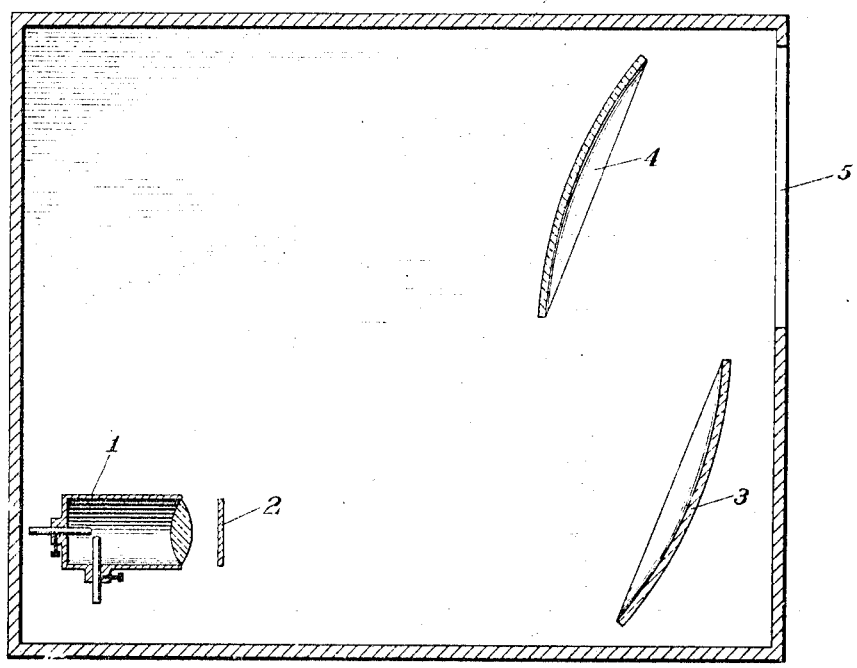
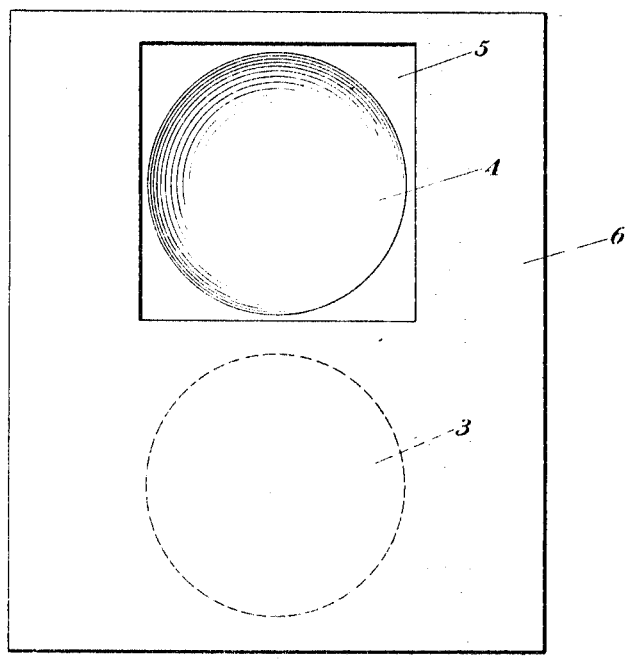

UNITED STATES PATENT OFFICE.

CHARLES W. SAALBURG, OF NEW YORK, N. Y.

EXHIBITION DEVICE.

1,053,650.  Specification of Letters Patent.  Patented Feb. 18, 1913.

Application filed October 20, 1911. Serial No. 655,700.

*To all whom it may concern:*

Be it known that I, CHARLES W. SAALBURG, of New York, in the county of New York, and in the State of New York, have invented a certain new and useful Improvement in Exhibition Devices, and do hereby declare that the following is a full, clear, and exact description thereof.

The object of my invention has been to produce an apparatus for exhibiting stereopticon pictures which shall have, among others, the advantage of being able to exhibit such pictures in broad daylight, and particularly to produce such an apparatus for exhibiting pictures in store windows, and to such ends my invention consists in the exhibiting device hereinafter specified.

In the accompanying drawings Figure 1 is a vertical sectional view of an apparatus embodying my invention, and Fig. 2 is a front view of such apparatus.

The form of my invention which is illustrated in the accompanying drawings is but one of many possible embodiments thereof, and is therefore to be regarded as typical only. Such form consists of a stereopticon or other source of illumination 1 adapted to throw light through a positive 2 which may be either the ordinary stereopticon slide or be the film of a moving picture. The light from the stereoscope or other source of illumination, after passing through the slide, strikes upon a preferably concave reflector 3 and is thrown upon a preferably concave mirror 4 and, passing out of the opening 5 in the casing 6 in which the apparatus is inclosed, the light reaches the eye of an observer. The casing is preferably a dead-black inside, so that it forms no reflection in the mirror. The reflector 3 is preferably white and of such a curvature as to produce a distortion which will just counterbalance that of the mirror 4, thus producing an undistorted image.

In operation the concave mirror 4 does not throw back to the observer any substantial portion of the light of the landscape. Light entering directly from the observer is thrown downward, or laterally, by the mirror and is never returned to the observer. As there is no reflection from within the casing, except that of the light passing through the slide, there is substantially no light which disturbs the image to be thrown to the observer. The result is that the observer sees the picture, magnified and erect and in strong contrast even though the apparatus be exhibited in broad daylight. As the stereopticon is back of the mirror 4, horizontally considered the latter can set well forward so as to be easily seen, even though of comparatively small size. For instance, if the mirror 4 is to be placed in a show window, it can be relatively close to the front of said window because the stereopticon does not have to be in front of it in order to produce this image. In this manner a relatively small mirror 4 can be used effectively. If the stereopticon has to be in front of the mirror 4 in order to throw its image into said mirror, the latter would have to be large in order to be seen by a person standing in front of the window.

I have found that, by using a moving picture projecting apparatus with the stereopticon, I can produce moving pictures in broad daylight.

Other objects can be substituted for the stereopticon and slide, and if properly lighted will appear as though actually present in the mirror 4.

It is obvious that various changes can be made in the illustrated embodiment of my invention, and I desire not to be limited to the specific form shown.

I claim—

1. In an exhibiting device, the combination of a concave mirror, a curved reflector, and an object in such position that said reflector will throw rays therefrom into said mirror.

2. In an exhibiting device, the combination of a mirror, a reflector and an object to be exhibited in such relation that rays from the object shall be thrown by the reflector into the mirror.

3. In an exhibiting device, the combination of a mirror, a reflector, an object to be exhibited in such relation that rays from the object shall be thrown by the reflector into the mirror, and a light-proof casing inclosing said parts, and having an opening in front of said mirror.

4. In an exhibiting device, the combination of a concave mirror, a curved reflector, curvatures of said parts being such as to counteract each other, and an object to be exhibited, the relations of said parts being such that said reflector shall throw rays from said object into said mirror.

5. In an exhibiting device, the combination of a concave mirror, a curved reflector, an object to be exhibited in such relation that said reflector shall throw rays from said object into said mirror, and a light-proof casing inclosing such parts, and having an opening in front of said mirror.

6. In an exhibiting device, the combination of a concave mirror, a curved reflector and a projection apparatus in such relation that light thrown from the projection apparatus shall be reflected into said mirror.

7. In an exhibiting device, the combination of a concave mirror, a curved reflector, a projection apparatus in such relation that light thrown from the projection apparatus shall be reflected into said mirror, and an inclosing light-proof casing having an opening in front of said mirror.

8. In an exhibiting device, the combination of a concave mirror, a curved reflector, a moving-picture film in such relation that light thrown from the film shall be reflected into said mirror, and an inclosing light-proof casing having an opening in front of said mirror.

In testimony that I claim the foregoing I have hereunto set my hand.

CHARLES W. SAALBURG.

Witnesses:
E. J. PRINDLE,
V. G. LLOYD.